United States Patent
Sugata

(10) Patent No.: US 7,010,154 B2
(45) Date of Patent: Mar. 7, 2006

(54) MONEY IDENTIFYING METHOD AND DEVICE

(75) Inventor: Masanori Sugata, Saitama (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 728 days.

(21) Appl. No.: 09/928,684

(22) Filed: Aug. 13, 2001

(65) Prior Publication Data

US 2002/0037096 A1    Mar. 28, 2002

(30) Foreign Application Priority Data

Sep. 28, 2000  (JP) .............................. 2000-296591

(51) Int. Cl.
*G06K 9/00* (2006.01)

(52) U.S. Cl. ...................... 382/136; 382/169; 382/172; 194/328

(58) Field of Classification Search ................ 382/136, 382/135, 140, 168, 171, 172, 199, 203, 270, 382/169, 273; 359/798; 194/317, 303, 302, 194/328, 334; 902/7; 73/163, 159; 356/71; 235/375; 705/45; 453/4

See application file for complete search history.

(56) References Cited

U.S. PATENT DOCUMENTS

| | | | | |
|---|---|---|---|---|
| 4,585,936 A | * | 4/1986 | Sellier .................... 250/223 R |
| 4,615,203 A | * | 10/1986 | Finsterwalder et al. ........ 72/345 |
| 4,791,678 A | * | 12/1988 | Iwase et al. ................ 382/169 |
| 5,144,495 A | * | 9/1992 | Merton et al. ............... 359/798 |
| 5,316,119 A | * | 5/1994 | Sugimoto et al. ........... 194/318 |
| 5,538,123 A | * | 7/1996 | Tsuji ........................... 194/303 |
| 5,784,500 A | * | 7/1998 | Homma et al. ............. 382/270 |
| 5,887,697 A | * | 3/1999 | Takahashi et al. .......... 194/317 |
| 5,896,464 A | * | 4/1999 | Horiuchi et al. ............ 382/178 |
| 5,912,992 A | * | 6/1999 | Sawada et al. ............. 382/274 |
| 6,142,285 A | * | 11/2000 | Panzeri et al. .............. 194/328 |
| 6,196,371 B1 | * | 3/2001 | Martin et al. ............... 194/317 |
| 6,272,248 B1 | * | 8/2001 | Saitoh et al. ............... 382/218 |
| 6,340,082 B1 | * | 1/2002 | House et al. ............... 194/317 |
| 6,412,620 B1 | * | 7/2002 | Imura ......................... 194/317 |
| 6,431,341 B1 | * | 8/2002 | Tsuji et al. .................. 194/317 |
| 6,484,865 B1 | * | 11/2002 | Hibari et al. ............... 194/330 |
| 6,520,308 B1 | * | 2/2003 | Martin et al. ............... 194/317 |
| 6,609,604 B1 | * | 8/2003 | Jones et al. ................. 194/302 |
| 6,685,000 B1 | * | 2/2004 | Sugata et al. ............... 194/328 |
| 6,778,693 B1 | * | 8/2004 | Jones et al. ................. 382/135 |

(Continued)

FOREIGN PATENT DOCUMENTS

JP          08-016871          1/1996

(Continued)

*Primary Examiner*—Barry Choobin
(74) *Attorney, Agent, or Firm*—Greer, Burns & Crain, Ltd.

(57) ABSTRACT

A money identifying method and a device which can identify money with high precision and quickly by optimally binarizing a surface image of the money. The center coordinates and radius of subject coin C are extracted by a coin shape extraction section from the surface image of the subject coin C obtained by an area sensor, and an effective threshold calculation range is extracted by a threshold calculation range extraction section 107 from the extracted center coordinates and radius of the coin. Further, a density histogram is created by a histogram generation section 108 on the basis of the threshold calculation range, an optimum binary threshold value is calculated from the density histogram by a binary threshold calculation section according to a discriminating analysis, and the optimum binary threshold value is used to binarize an image for identifying the subject coin C.

4 Claims, 4 Drawing Sheets

U.S. PATENT DOCUMENTS

2002/0005329 A1 * 1/2002 Sugata et al. .............. 194/302
2002/0037096 A1 * 3/2002 Sugata ...................... 382/136
2004/0108183 A1 * 6/2004 Sugata et al. .............. 194/328

FOREIGN PATENT DOCUMENTS

JP 09-231432 9/1997

* cited by examiner

MONEY IDENTIFYING METHOD AND DEVICE

BACKGROUND OF THE INVENTION

1. Field of the Invention

The present invention relates to a money identifying method and a device for identifying money on the basis of a surface image of the money, and more particularly to a money identifying method and a device which improves its money identification accuracy by determining a binary threshold value based on a density histogram of a predetermined part of the money to optimize binarization of the money.

2. Description of the Related Art

Conventional coin identifying devices for identifying coins are comprised of one or more magnetic sensors disposed on a coin passage through which coins inserted through a coin insertion port are moving, to determine a material, thickness and size of each coin on the basis of detection output from the magnetic sensor(s) and to identify the inserted coins as authentic or counterfeit and denominations according to the determined results.

But, coin identifying devices having the prior art magnetic sensors have a problem in that identification of a coin as authentic or counterfeit and denomination has become more difficult because the accuracy of making an altered coin, which is a foreign coin similar in material and shape to a domestic authentic coin, has improved.

In order to detect such altered coins, it becomes necessity to identify coins with higher accuracy. It is proposed to use a surface pattern of each coin as an identification element for identifying the coins.

For example, Japanese Patent Application Laid-Open No. 8-16871 discloses a method which is comprised of irradiating light to a surface of a coin, detecting a reflected light by an area sensor, converting the detected image into an electrical signal, performing a binarization processing of the converted image signal, and identifying the surface pattern of the coin from the binary image.

Japanese Patent Application Laid-Open No. 9-231432 discloses a method which is comprised of irradiating light to a surface of a coin, detecting a reflected light by an area sensor, converting the detected image into an electrical signal, detecting a material of the coin by a magnetic sensor, identifying denomination of the coin, extracting an effective image area according to the identified denomination of the coin, determining a binary threshold value of the extracted image area, performing a binarization processing of the image signal of the coin surface, and identifying the surface pattern of the coin from the binary image.

But, the aforesaid prior technologies disclosed in Japanese Patent Application Laid-Open No. 8-16871 and No. 9-231432 have disadvantages in that, because the binary threshold value for binarizing a two-dimensional image is variable depending on brightness and contrast of the original two-dimensional image, it is necessary to adjust a method of calculating the binary threshold value according to a state of the image, and in order to calculate an effective binary threshold value, it is necessary to calculate variance between classes with respect to the respective binary threshold values by sequentially changing the threshold value within a predetermined range, and it takes significant time to calculate the binary threshold value. Thus, it was difficult to speed up the coin identification.

Where a two-dimensional image of an uneven surface pattern inherently not having a large difference between light and shade portions of a coin is binarized, if an unnecessary area such as a background of the image (part where the coin is not imaged) is included in the image area, the binary threshold value calculated from the image area is not a binary threshold value effective for identifying the uneven surface pattern of the coin but a binary threshold value effective for determining a boundary between the periphery of the coin and the background of the image, and it becomes difficult to identify the uneven surface pattern of the coin.

Such problems are not limited to the identification of coins but also apply to the identification of money performed by obtaining a surface image of money such as paper money and binarizing the surface image.

SUMMARY OF THE INVENTION

It is an object of the present invention to provide a money identifying method and a device which can identify money highly accurately and quickly by optimizing the binarization of a surface image of money.

The money identifying method of the present invention comprises the steps of: obtaining a surface image of money; extracting a particular threshold calculation range of the obtained surface image; determining a density histogram of the extracted threshold calculation range; calculating a binary threshold value for binarizing from the determined density histogram by a discriminating analysis; binarizing the obtained surface image of the money on the basis of the calculated binary threshold value; and identifying the money based on the binary image.

Here, the money includes coins and also paper money and the like. The surface image of the money includes images of the front and back of a coin and also an image of its side, and images of the front and back of paper money.

The extraction of the threshold calculation range is performed by extracting an image of a predetermined area containing a feature area subject to the judgment of the money and not containing the background.

Here, when the money is a coin, the extraction of the threshold calculation range is performed by determining center coordinates and radius of the coin on the basis of the surface image and extracting the image of the predetermined area on the basis of the determined center coordinates and radius.

The money identifying device of the present invention comprises image obtaining means for obtaining a surface image of money; extracting means for extracting an image of a particular threshold calculation range of the surface image of the money obtained by the image obtaining means; binary threshold calculation means for determining a density histogram of the image of the threshold calculation range extracted by the extracting means and calculating a binary threshold value for binarizing from the determined density histogram by applying a discriminating analysis; binarizing means for binarizing the surface image obtained by the image obtaining means using the binary threshold value calculated by the binary threshold calculation means; and identifying means for identifying the money on the basis of the binary image binarized by the binarizing means.

Here, the image obtaining means comprises lighting means for illuminating a surface of the money, and image-pickup means for taking a picture of the surface of the money illuminated by the lighting means.

The extracting means extracts an image of a predetermined area containing a feature area subject to the judgment of the money and not containing a background.

Here, the money is a coin, and the extracting means comprises determining means for determining center coordinates and radius of the coin on the basis of the surface image, and area extracting means for extracting the image of the predetermined area on the basis of the center coordinates and radius of the coin determined by the determining means.

According to the present invention, it is configured to extract a particular threshold calculation range of a surface image of money, to determine a density histogram of the extracted threshold calculation range, and to calculate a binary threshold value for the binarization from the determined density histogram by a discriminating analysis, so that a surface pattern of the coin can be detected with high accuracy and quickly.

DESCRIPTION OF THE PREFERRED EMBODIMENTS

Embodiments of the money identifying method and device to which the present invention pertains will be described in detail with reference to the accompanying drawings.

Figure 1:
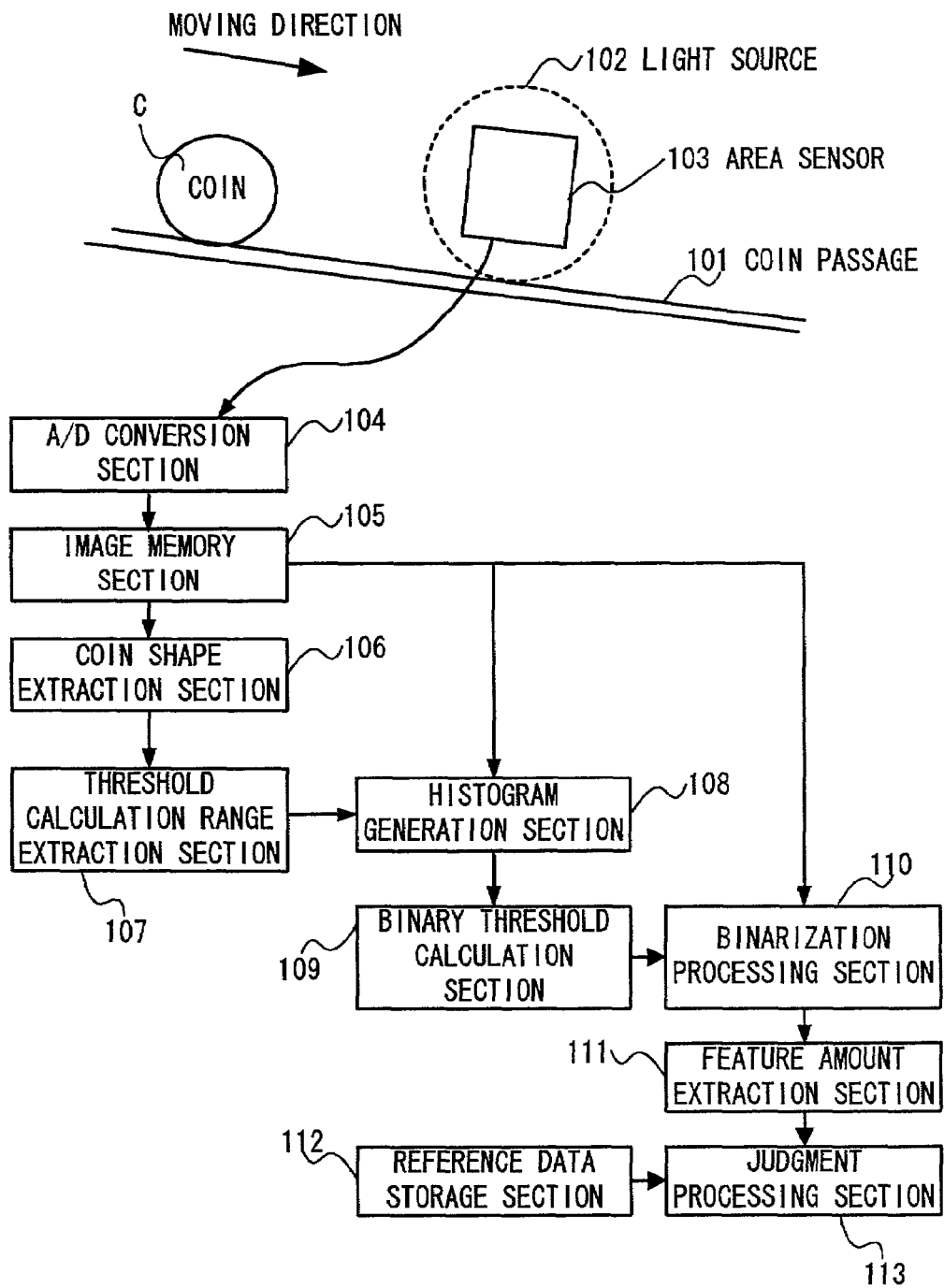
FIG. 1 is a diagram showing a schematic structure of a coin identifying device which is configured by applying the money identifying method and device to which the present invention pertains.

FIG. 1 is a diagram showing a schematic structure of a coin identifying device which is configured by applying the money identifying method and device to which the present invention pertains.

The coin identifying device shown in FIG. 1 takes a surface picture of subject coin C rolling through coin passage 101 which is formed to have a predetermined inclination by area sensor 103, and identifies the subject coin C based on the pictured image information.

The subject coin C, inserted through an unshown coin insertion port, rolls through the coin passage 101 in a direction indicated by an arrow.

The area sensor 103 is disposed at a predetermined position of the coin passage 101, takes a surface picture of the subject coin C which is rolling through the coin passage 101, and obtains an analog image signal corresponding to the surface image of the subject coin C.

The analog image signal is converted into digital multivalued image data by analog-to-digital conversion section (AID conversion section) 104, and the image data is stored in image memory section 105.

Coin shape extraction section 106 extracts the center coordinates and radius of the subject coin C on the basis of multivalued image data corresponding to the surface image of the subject coin C stored in the image memory section 105.

The extraction of the center coordinates and radius of the subject coin C by the coin shape extraction section 106 is performed by extracting an image of the periphery of the subject coin C from the multivalued image data stored in the image memory section 105, extracting the center of the image of the periphery of the subject coin C as the center coordinates of the subject coin C, and extracting a distance from the center coordinates to the periphery as the radius of the subject coin C.

Threshold calculation range extraction section 107 extracts as a threshold calculation range an area effective for determining a threshold value for binarizing the multivalued image data stored in the image memory section 105 on the basis of the center coordinates and radius of the subject coin C extracted by the coin shape extraction section 106.

The threshold calculation range extracted by the threshold calculation range extraction section 107 is a predetermined reference area, which includes projections and depressions which are subject to judgment of the subject coin C and does not include an unnecessary area such as a background or the like, and an image of the reference area is extracted on the basis of the center coordinates and radius of the subject coin C which are extracted by the coin shape extraction section 106.

Histogram generation section 108 reads the multivalued image data of the threshold calculation range, which was extracted by the threshold calculation range extraction section 107, from the image memory section 105, and creates a density histogram according to the read multivalued image data of the threshold calculation range.

Binary threshold calculation section 109 calculates an optimum binary threshold value by a discriminating analysis on the basis of the density histogram created by the histogram generation section 108.

And, binarization processing section 110 binarizes the multivalued image data stored in the image memory section 105 by using the optimum binary threshold value calculated by the binary threshold calculation section 109. Feature extraction section 111 extracts a feature amount of the subject coin C on the basis of the binary image data. Judgment processing section 113 compares the feature amount of the subject coin C extracted by the feature extraction section 111 with reference data of authentic coins previously stored in reference data storage section 112 to identify the subject coin C.

Figure 2:
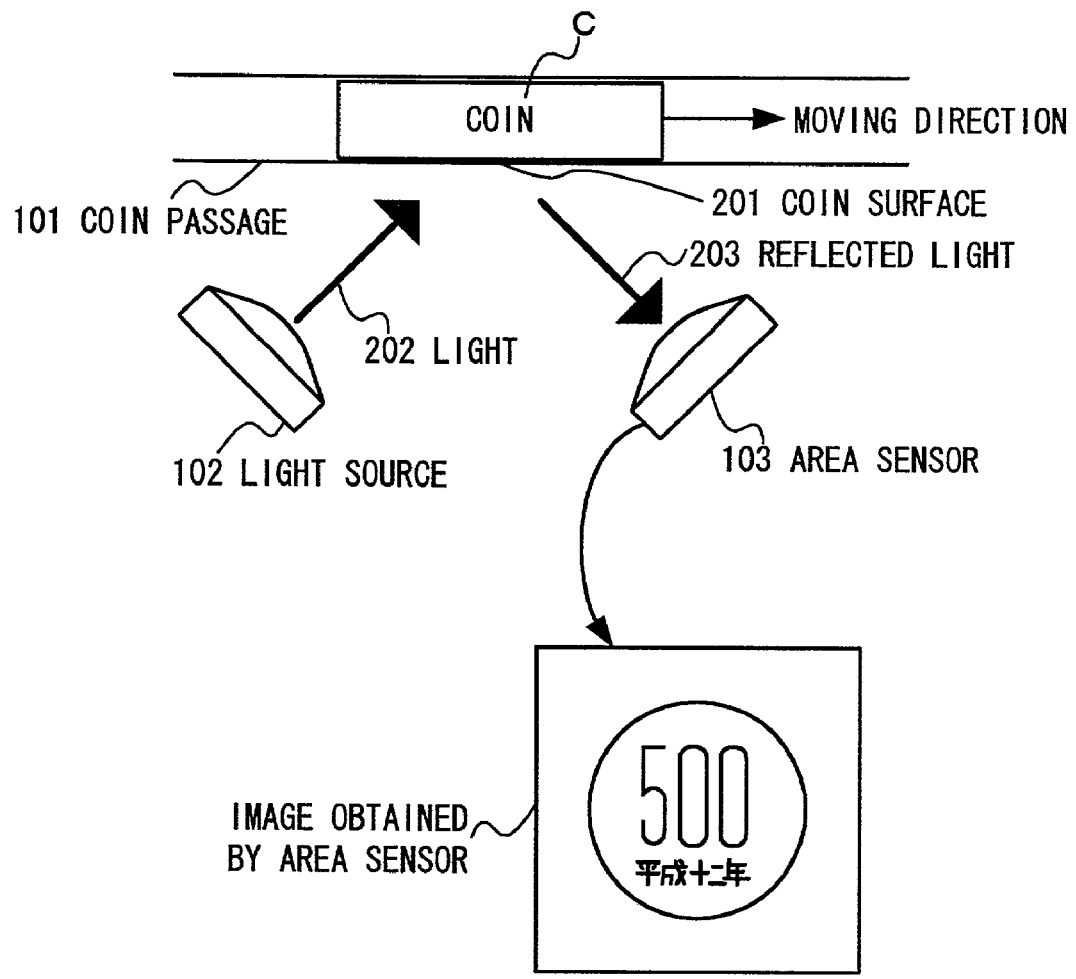
FIG. 2 is a diagram showing details of processing to obtain a surface image of a subject coin to be detected which is rolling through the coin passage shown in FIG. 1.

FIG. 2 is a diagram showing details of processing to obtain a surface image of the subject coin C (hereinafter called coin C) rolling through the coin passage 101 shown in FIG. 1.

In FIG. 2, coin surface 201 of the coin C rolling through the coin passage 101 is irradiated with a pulse of light 202 from light source 102, and reflected light 203, which is reflected from the coin surface 201 of the coin C by the irradiation, is received by the area sensor 103 to obtain a still surface image of the coin C.

The surface image (analog image signal) of the coin C obtained by the area sensor 103 is converted into digital multivalued image data by the A/D conversion section 104 shown in FIG. 1, and the multivalued image data is binarized by the binarization processing section 110 shown in FIG. 1 and converted into binary image data in order to make it easy to determine a surface pattern of the coin C.

In this embodiment, the optimum binary threshold value for the aforesaid binarization processing is calculated by the binary threshold calculation section 109 according to a discriminating analysis on the basis of the density histogram created by the histogram generation section 108 for the threshold calculation range extracted by the threshold calculation range extraction section 107 shown in FIG. 1.

The optimum binary threshold value is calculated by the discriminating analysis as follows.

First, a density histogram is created from the surface image signal of the coin C by the histogram generation section 108, a pixel density is divided into 256 levels of gray (8 bits), and a threshold value for binarizing the surface image signal of the coin C is determined as K.

Further, two sections divided by the binary threshold value K are determined as $S_1$ and $S_2$, variance $\sigma_{12}$ between the sections $S_1$ and $S_2$, where section $S_1$=[0, 1, ... K-1] and section $S_2$=[K, ... 254, 255], is calculated, and the binary threshold value K which maximizes the variance $\sigma_{12}$ is calculated as an optimum binary threshold value.

Here, in this embodiment, the density histogram is created with the predetermined reference area, which includes the projections and depressions subject to the judgment of the coin C and does not include the unnecessary area such as the background, as the threshold calculation range, and the optimum binary threshold value is determined on the basis of the density histogram, so that the image of projections and depressions subject to the judgment can be obtained clearly as compared with a case of deciding the optimum binary threshold value with the entire image determined as the threshold calculation range.

Figure 3A:
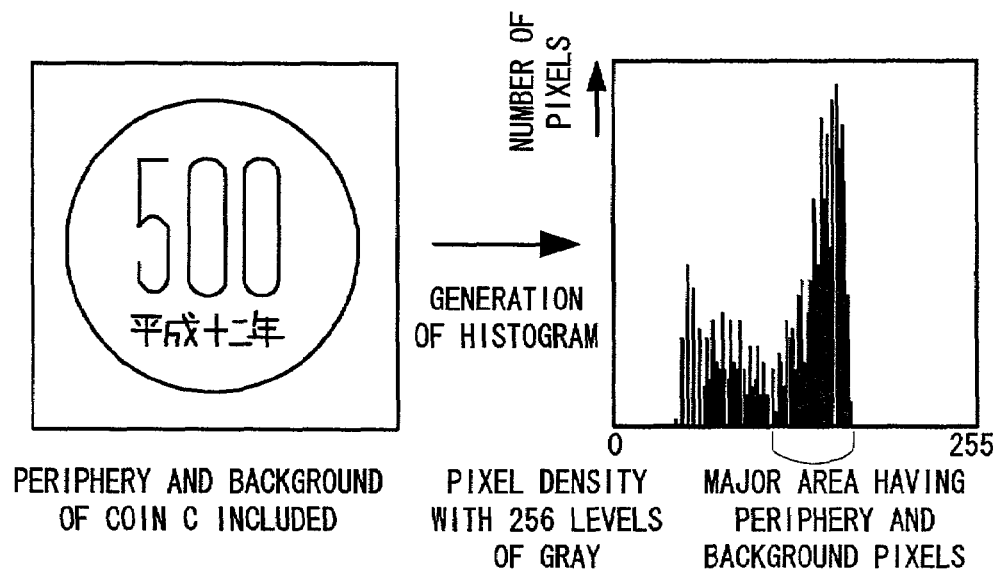
FIGS. 3(a) and 3(b) are diagrams showing comparison of a density histogram which is created with an entire image including a background obtained by the area sensor shown in FIG. 1 determined as a threshold calculation range and a density histogram which is created by the histogram generation section shown in FIG. 1.
Figure 3B:
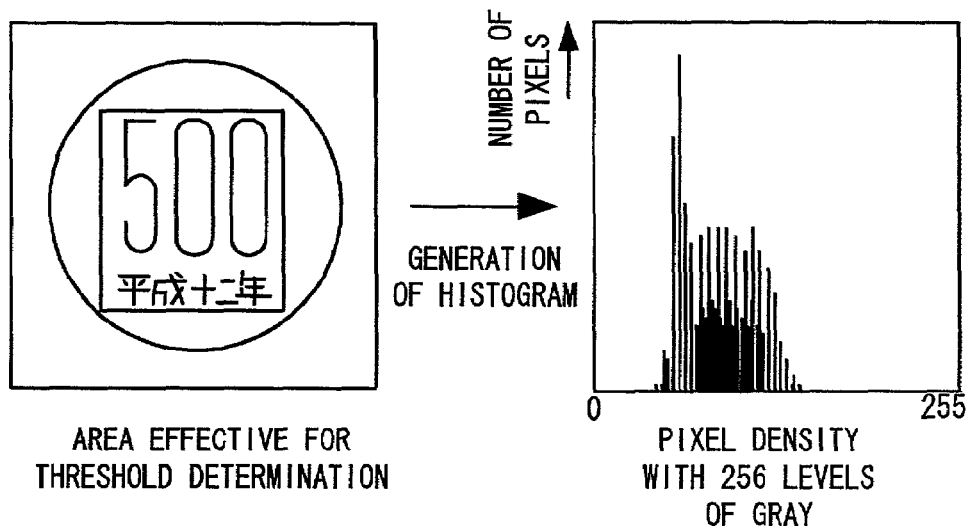

FIGS. 3(a) and 3(b) are diagrams showing comparison of a density histogram which is created with the entire image including the background obtained by the area sensor 103 shown in FIG. 1 determined as the threshold calculation area and a density histogram which is created by the histogram generation section 108 shown in FIG. 1.

FIG. 3(a) shows a density histogram created with the entire image including the background obtained by the area sensor 103 determined as the threshold calculation range, and FIG. 3(b) shows a density histogram created with the predetermined reference area, which includes projections and depressions subject to judgment of the coin C according to the embodiment and does not include the unnecessary area such as the background, determined as the threshold calculation range.

In FIGS. 3(a) and 3(b), the vertical axis indicates the number of pixels (or density occurrence frequency), and the horizontal axis indicates a pixel density.

It is apparent from FIGS. 3(a) and 3(b) that the density histogram of FIG. 3(a) is quite different from the density histogram of FIG. 3(b) because the periphery and background pixels of the coin C cover most of the area, and when the optimum binary threshold value is calculated from the density histogram of FIG. 3 (a), a binary image which clearly shows an image of projections and depressions subject to judgment cannot be obtained, and the image of projections and depressions subject to judgment cannot be identified accurately.

Meanwhile, the binary threshold calculation section 109 of this embodiment calculates the optimum binary threshold value by using the density histogram created with the predetermined reference area, which includes the projections and depressions subject to judgment of the coin C and does not include the unnecessary area such as the background as shown in FIG. 3(b), determined as the threshold calculation range, so that a binary image clearly showing the image of projections and depressions subject to judgment can be obtained.

Figure 4:
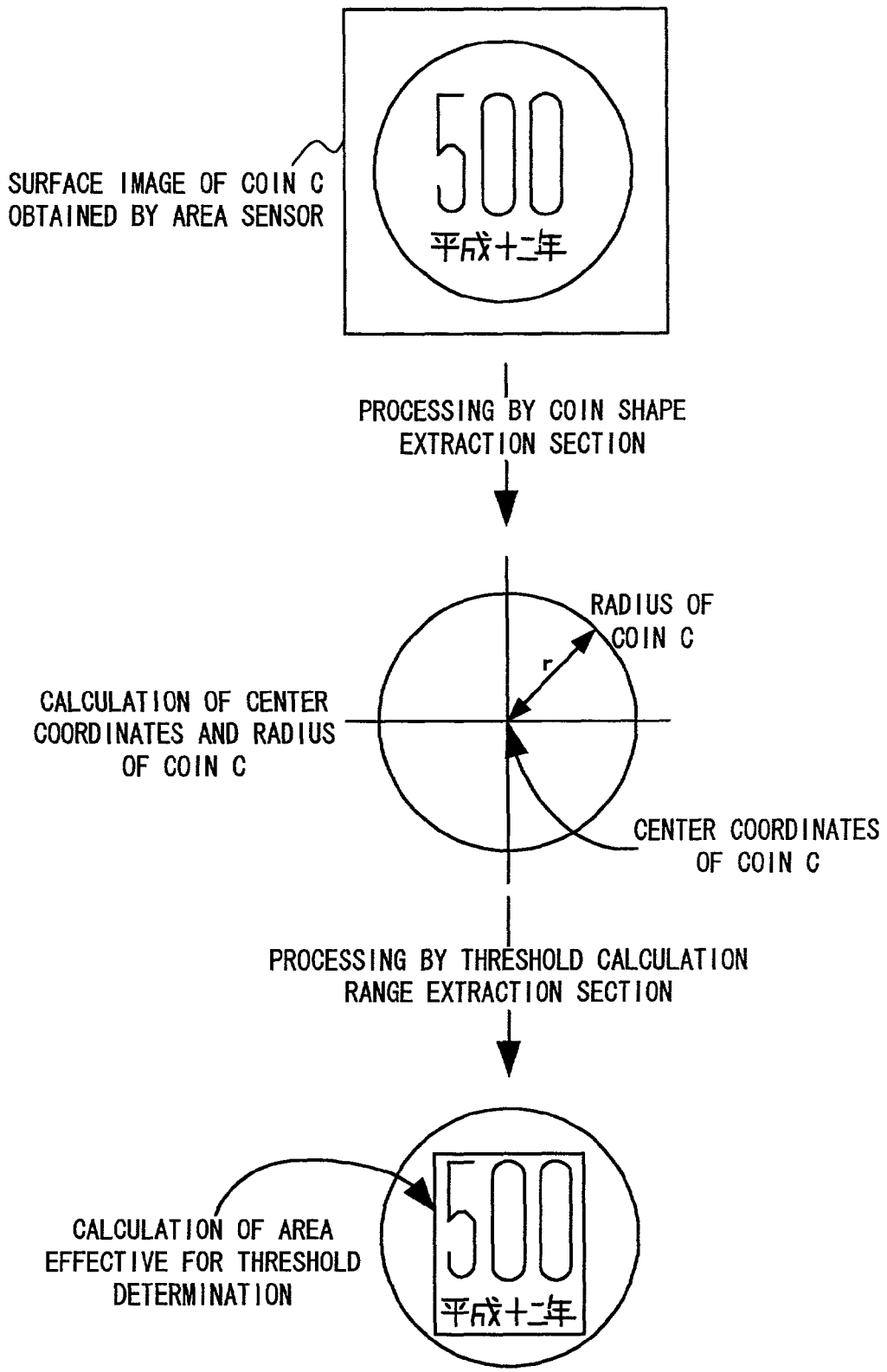
FIG. 4 is a diagram showing details of processing by the coin shape extraction section and the threshold calculation range extraction section shown in FIG. 1.

FIG. 4 is a diagram showing details of processing by the coin shape extraction section 106 and the threshold calculation range extraction section 107 shown in FIG. 1.

The threshold calculation range used to determine the binary threshold value in order to effectively identify the surface pattern of the coin C is desirably the periphery of the surface pattern as shown in FIG. 4. Accordingly, the threshold calculation range of the image is extracted on the basis of the center coordinates and radius of the coin C in this embodiment.

The coin shape extraction section 106 shown in FIG. 1 extracts the center coordinates of the coin C and the radius of the coin C from the image (multivalued image data stored in the image memory section 105 of FIG. 1) of the coin C obtained by the area sensor 103.

And, the threshold calculation range extraction section 107 extracts an area (threshold calculation range) effective for calculation of the binary threshold value on the basis of the center coordinates of the coin C and the radius of the coin C extracted by the coin shape extraction section 106.

The shape of the threshold calculation range extracted by the threshold calculation range extraction section 107 is not limited to the rectangle shown in FIG. 4 but may be a circle or the like in some cases.

According to the present invention, the image subject to the judgment is not limited to the surface image of the coin, and the image of the side face of the coin can also be used.

The method of obtaining the image according to the present invention is not limited to one using an area sensor which is an optical sensor. A magnetic sensor or the like which can obtain two-dimensional information of a coin while the coin is passing can also be used.

The above embodiment was described in connection with the identification of coins, but the present invention can also be applied to identification of any kind of money such as paper money or the like.

What is claimed is:

1. A money identifying method, comprising the steps of:
obtaining a surface image of a coin;
determining center coordinates and radius of the coin on the basis of the obtained surface image;
extracting from the obtained surface image a previously set particular threshold calculation range containing a feature area of the coin subject to judgment and not containing a background, on the basis of the determined center coordinates and radius;
determining a density histogram of the extracted threshold calculation range;
calculating a binary threshold value for binarizing from the determined density histogram by a discriminating analysis;
binarizing the obtained surface image of the coin on the basis of the calculated binary threshold value; and
identifying the coin based on the binarized image.

2. A money identifying device, comprising:
image obtaining means for obtaining a surface image of a coin;
extracting means for determining center coordinates and radius of the coin on the basis of the surface image of the coin obtained by the image obtaining means and extracting from the surface image a previously set particular threshold calculation range containing a feature area of the coin subject to judgment and not containing a background, on the basis of the determined center coordinates the radius;

binary threshold calculation means for determining a density histogram of an image of the threshold calculation range extracted by the extracting means and calculating a binary threshold value for binarizing from the determined density histogram by applying a discriminating analysis;

binarizing means for binarizing the surface image obtained by the image obtaining means using the binary threshold value calculated by the binary threshold calculation means; and identifying means for identifying the coin on the basis of the binary image binarized by the binarizing means.

3. The money identifying device according to claim 2, wherein the image obtaining means comprises:

lighting means for illuminating a surface of the coin; and image-pickup means for taking a picture of the surface of the coin illuminated by the lighting means.

4. The money identifying device according to claim, 2 wherein the extracting means comprises:

determining means for determining the center coordinates and the radius of the coin on the basis of the surface image; and area extracting means for extracting the image of an area of the threshold calculation range on the basis of the center coordinates and the radius of the coin determined by the determining means.

* * * * *